(12) United States Patent  
Okamoto et al.

(10) Patent No.: US 8,494,309 B2
(45) Date of Patent: Jul. 23, 2013

(54) DATA PROCESSING APPARATUS

(75) Inventors: Yuji Okamoto, Kyoto (JP); Naofumi Ueda, Kyoto (JP); Syoichiro Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1397 days.

(21) Appl. No.: 11/499,527

(22) Filed: Aug. 4, 2006

(65) Prior Publication Data

US 2007/0030518 A1 Feb. 8, 2007

(30) Foreign Application Priority Data

Aug. 8, 2005 (JP) .................... 2005-229683

(51) Int. Cl.
*G06K 9/54* (2006.01)
(52) U.S. Cl.
USPC .......... 382/305; 358/1.14; 358/1.16; 358/1.1
(58) Field of Classification Search
USPC ....................................................... 382/305
See application file for complete search history.

(56) References Cited

U.S. PATENT DOCUMENTS 6,731,447 B2 * 5/2004 Bunker et al. .................. 360/60
6,833,926 B1 * 12/2004 Takano et al. ............... 358/1.15
2004/0114182 A1 * 6/2004 Davis ........................... 358/1.16
2004/0114265 A1 * 6/2004 Talbert ............................ 360/60
2005/0052681 A1 * 3/2005 Kogi ............................ 358/1.14
2005/0151997 A1   7/2005 Murakami et al.

FOREIGN PATENT DOCUMENTS

| CN | 1554180 A | 12/2004 |
| JP | 11-321036 | 11/1999 |
| JP | 2004-005586 | 1/2004 |

\* cited by examiner

*Primary Examiner* — David Zarka
*Assistant Examiner* — Mark Roz
(74) *Attorney, Agent, or Firm* — Edwards Wildman Palmer LLP; David G. Conlin; David A. Tucker

(57) ABSTRACT

In local memory that stores image data, the image data is invalidated to prevent leakage of the image data. Input image data is stored in local memory 10 and subjected to image processing, and then it is saved in a hard disk device 4. The image data that is read from the hard disk device 4 is stored in the local memory 10, and then printed as an image from a printing portion 3*a* or transmitted from a communication section 5 in data communication. When image data input is completed, image data is left stored in the local memory 10. Therefore, the image data is overwritten with random data and invalidated so that the image data is unreadable. Also, when image data processing is completed, image data is invalidated.

9 Claims, 6 Drawing Sheets

DATA PROCESSING APPARATUS

BACKGROUND OF THE INVENTION

1. Field of the Invention

The present invention relates to a data processing apparatus that stores input image data and processes the image data such as for printing, image communication, and facsimile communication.

2. Description of the Related Art

In a data processing apparatus with a copy function for electronically scanning and reading an image on a document and copying image data, several functions have been further combined in recent years. For example, such a data processing apparatus may have the following functions: a network printer function for connecting to a network such as a LAN, receiving image data from an information processing apparatus such as a personal computer, and printing an image; a network scanner function for reading image data and transmitting the image data to an information processing apparatus; and a facsimile function for transmitting and receiving image data to and from an external facsimile machine via a network or a telephone line.

A multifunctional data processing apparatus includes a storage device for temporarily storing input image data. Various types of storage devices exist, including those made of semiconductor memory and those implemented as a magnetic storage medium such as a hard disk device. These storage devices allow efficient processing of a large amount of image data and a plurality of jobs.

In a data processing apparatus, semiconductor memory with a fast read/write capability is used as local memory for storing image data being processed, and a hard disk device is used for temporarily saving image data to be processed. Input image data is subjected to image processing such as compression in the local memory and then temporarily saved in the hard disk device. When the turn comes for the image data to be processed, the saved image data is read and subjected to image processing such as decompression in the local memory. The image data is further subjected to desired processing such as printing, image communication, or facsimile communication, and then output to the outside.

When sensitive data is processed in such a data processing apparatus, security measures are taken. For example, on completion of the processing, the image data in the hard disk device is erased or overwritten with random data as described in Japanese Patent Laid-Open No. 9-284572. Further, the erasure is repeated several times as described in Japanese Patent Laid-Open No. 2004-7059. Thus, the image data saved in the hard disk device is made completely unreadable and is invalidated.

For local memory implemented using volatile memory, new image data is stored by overwriting old image data with the new image data. When the power supply for the local memory is shut off, the image data is erased. However, in the case where the data processing apparatus is used round-the-clock, the power is always on and therefore the local memory always contains image data.

Here, a fault may occur in the data processing apparatus due to a noise or an incorrectly sensed document, resulting in that image data input may get out of order, or image data input may be falsely detected although no image data is input. Then, processing goes on without overwriting the old image data stored in the local memory. This causes a problem, for example, that the previously input image is printed, and gives the user security concern.

In the light of the above issues, the object of the present invention is to provide a data processing apparatus that invalidates image data in local memory to prevent leakage of old image data in the event of a fault.

SUMMARY OF THE INVENTION

The present invention comprises: input means for inputting image data; processing means for processing the input image data; storage means for storing the image data being processed; invalidation means for invalidating the image data stored in the storage means; and control means for controlling activation of the invalidation means according to the operational status of the apparatus.

When the apparatus is operating, image data is sequentially stored in the storage means implemented as local memory. The image data is processed and therefore need not be invalidated. That is, the control means inhibits activation of the invalidation means when the apparatus continues its operation, and activates the invalidation means when the apparatus terminates its operation. Therefore, image data last stored in the storage means is invalidated, so that the image data cannot be reproduced.

The apparatus also comprises saving means for temporarily saving image data to be processed. When image data is processed, the storage means stores the image data by overwriting old image data with the image data relevant to the processing. The saving means saves image data transferred from the storage means, and when the image data is processed, outputs the saved image data to the storage means. Thus, image data in the storage means can be invalidated by overwriting the image data with random data.

When input of image data for a certain job is completed, the control means activates the invalidation means to invalidate the image data in the storage means. As an operational status, whether or not image data is input may be detected. If image data is input, the job is under way and activation of the invalidation means is inhibited. If no image data is input, the job is over and the invalidation means is activated. Thus, the invalidation is performed on a job basis.

Specifically, the control means saves, in the saving means, image data stored in the storage means, and thereafter, when no image data is input, activates the invalidation means to invalidate the image data in the storage means. Also, the control means reads image data saved in the saving means and stores the data in the storage means, and after processing on the image data is completed and when no image data is input, activates the invalidation means to invalidate the image data in the storage means.

When input of image data is interrupted in the middle of a job, the control means activates the invalidation means to invalidate the image data in the storage means. One operational state is the case where a job is canceled before completion. In this case, no image data is input and therefore the invalidation means is activated.

Another operational status is the case where the operation is stopped due to an occurrence of a fault. Therefore, fault detection means for detecting a fault in the apparatus may be provided. When a fault is detected and the operation of the apparatus is stopped, the control means causes the invalidation means to invalidate image data in the storage means.

When the fault is recovered and the apparatus operates normally, the old data stored in the storage means is no more in the previous form. Therefore, even if a processing such as printing is performed based on the image data stored in the storage means, the original image data cannot be reproduced and leakage of a secret is prevented.

Another operational status relates to the on/off status of the power. While the power is on, the control means periodically activates the invalidation means to invalidate image data in the storage means. Before activating the invalidation means, the control means checks processing operation of the apparatus. If the apparatus is in the middle of the processing operation, activation of the invalidation means is inhibited. If the invalidation overlaps with the processing operation, the processing operation precedes the invalidation, which is performed after the processing operation is completed.

In terms of activation timing, the invalidation means may be activated at a preset time or at preset time intervals. While the power is on, the invalidation of image data is periodically performed.

The control means further invalidates image data in the saving means when processing on the image data is completed. This allows complete invalidation of input image data. Image data in the saving means may also be invalidated when input of image data is interrupted in the middle of a job, or when the operation is stopped due to an occurrence of a fault.

The invalidation means comprises a first invalidation processing means for invalidating image data in the storage means and a second invalidation processing means for invalidating image data in the saving means. The control means selectively performs at least one of the first and second invalidation processing. In the operational status where the power is continuously on, at least the first invalidation processing means is selected. In some types of storage means, image data is erased upon power-off. Therefore, in the operational status where the power is turned on and off, at least the second invalidation processing means is selected.

According to the present invention, while image data is input and stored in the storage means implemented as local memory, the image data in the storage means is invalidated when a change in the operational status occurs, such as completion of image data input, completion of a job, interruption of a job, or an occurrence of a fault. Therefore, old image data left in the storage means will not be output. This prevents leakage of image data, thereby enhancing security in the data processing apparatus.

DETAILED DESCRIPTION OF THE PREFERRED EMBODIMENTS

Figure 1:
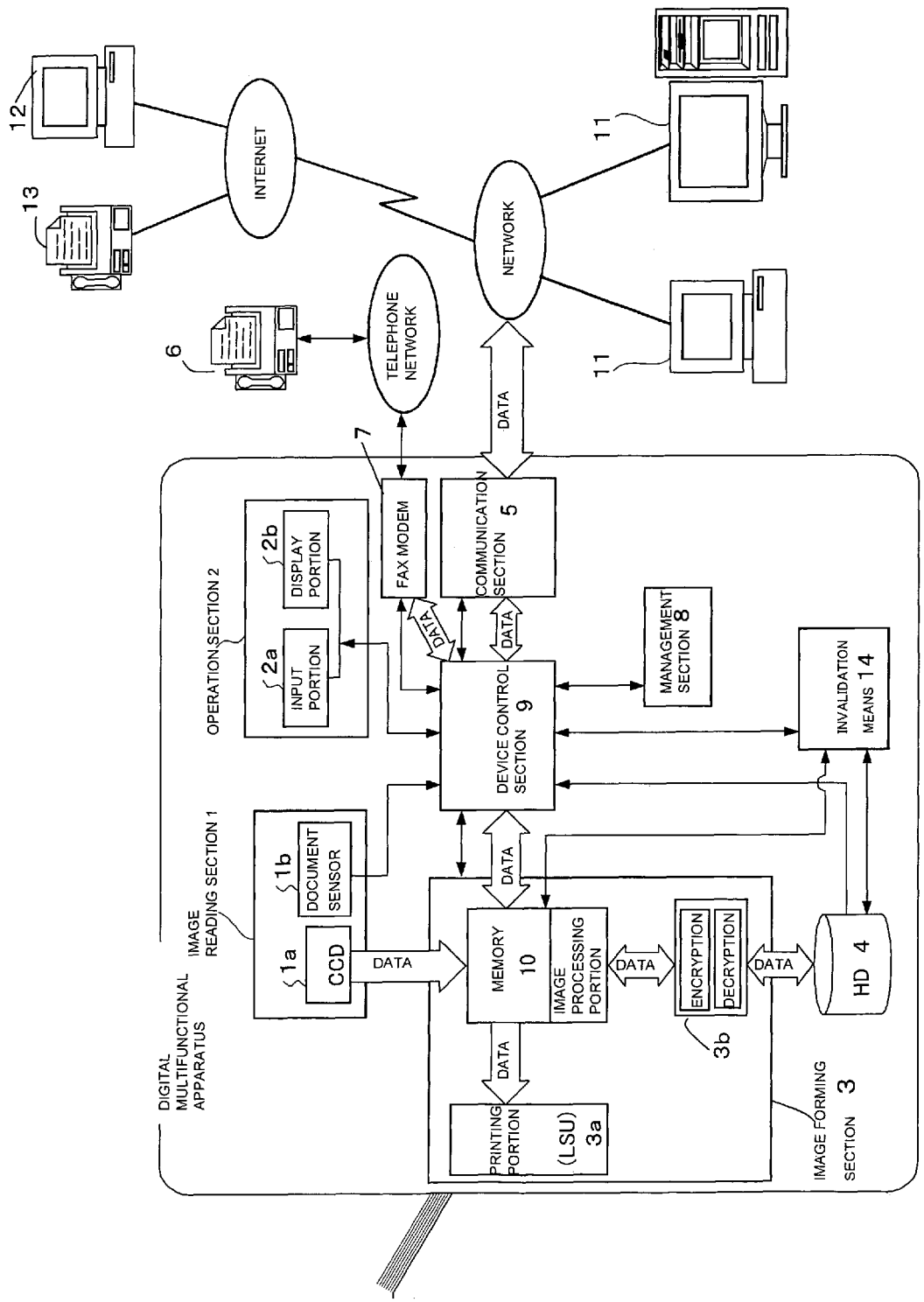
FIG. 1 is a diagram showing a schematic configuration of a digital multifunctional machine, which is an embodiment of a data processing apparatus of the present invention.

FIG. 1 shows a data processing apparatus in an embodiment. The data processing apparatus is a digital multifunction machine having copy mode, printer mode, scanner mode, and facsimile mode. The data processing apparatus includes: an image reading section 1 that reads a document and inputs image data; an operation section 2 that receives user inputs; an image forming section 3 that prints image data; a hard disk device 4 that saves image data; a communication section 5 that communicates with external apparatus; a fax modem 7 for communicating with a facsimile machine 6; a management section 8 that stores information such as control information and setting information about the entire apparatus; and a device control section 9 responsible for controlling the entire apparatus.

The image reading section 1 functions as input means for inputting image data and includes an image pickup device such as a CCD 1a, and a document sensor 1b that senses a document placed on a document platform or on an automatic document feeder (ADF). The image data read by the CCD 1a is output to the image forming section 3.

The operation section 2 includes an input portion 2a consisting of various input keys, and a display portion 2b such as a liquid crystal display. The operation section 2 allows operations for the entire apparatus and inputting of various settings, and displays the input content and the operational status of the entire apparatus.

The image forming section 3 has a local memory 10 as storage means for storing image data, a printing portion 3a implemented as a laser scanning unit, and a security portion 3b for encrypting and decrypting image data. The local memory 10 is implemented using readable/writable semiconductor memory, such as SDRAM or flash memory. The local memory 10 stores image data by overwriting old image data with new image data. The printing portion 3a prints an image on a recording sheet that is fed from a paper feeding portion (not shown) based on the image data stored in the local memory 10.

In the image forming section 3, input image data is stored in the local memory 10, in which the image data is subjected to image processing such as compression, decompression, or modification. The processed image data is output to the printing portion 3a, the hard disk device 4, or the device control section 9. The local memory 10 is divided into an input data area for storing input image data, and an output data area for storing image data to be output. Instead of using a single divided local memory 10, two units of local memory 10 may be used.

The hard disk device 4 is saving means for temporarily saving image data to be processed. When image data is saved in the hard disk device 4, the image data is encrypted as necessary.

The communication section 5 is connected to a router, switching hub or the like via a LAN cable, and further connected to a network formed by information processing apparatus 11 such as personal computers and servers. The network is connected to the Internet via a telephone network or via a communication line such as a fiber-optic line. The communication section 5 transmits and receives data to and from the information processing apparatus 11 in the network, and to and from external information processing apparatus 12 and facsimile machine 13 over the Internet. The fax modem 7 is connected to a telephone network via a telephone line and performs facsimile communication with the external facsimile machine 6. Thus, since image data is input via the communication section 5 and the fax modem 7, they also function as input means.

In response to an input from the operation section 2 or a data input from an external apparatus, the device control section 9 controls relevant components based on information stored in the management section 8 and processes the input image data. That is, the input image data is processed in either of copy mode, printer mode, scanner mode, or facsimile mode.

The data processing apparatus further includes invalidation means 14 for invalidating image data in the local memory 10 and the hard disk device 4. The device control section 9 controls activation of the invalidation means 14 according to the operational status of the entire apparatus. Invalidation of image data means to make stored image data unreadable by overwriting the image data with random data or meaningless data or by erasing the image data so that the original image cannot be reproduced. Therefore, the invalidation means 14 invalidates image data in the local memory 10 by overwriting the image data, and invalidates image data in the hard disk device 4 by overwriting or erasing the image data. If the local memory 10 is implemented using volatile memory, the stored image data is erased upon power-off. Therefore, if volatile memory is used, the invalidation means 14 may shut off the power supply for the local memory 10.

Now, operations in each mode will be described. In copy mode, image data of a document that is read by the image reading section 1 is output as a copy from the image forming section 3. Specifically, an image of a document placed at a reading position is read by the CCD 1*a*. The image data that is output from the CCD 1*a* is made up into an outputting image in the local memory 10 and sent to the hard disk device 4 to be temporarily saved there. For a plurality of documents, this reading and storage operation is repeated.

Then, based on processing indications provided from the operating section 2, the image data saved in the hard disk device 4 is sequentially read in a timely manner and sent to the local memory 10. Timed to writing operations to the printing portion 3*a*, the image data is transferred from the local memory 10 to the printing portion 3*a*, and the image is printed on a recording sheet.

Similarly, if a plurality of copies of the read image data are printed, the image data is saved on a page basis in the hard disk device 4 as an outputting image and sent from the hard disk device 4 to the local memory 10 according to the output mode. Timed to writing operations to the printing portion 3*a*, the image data in the local memory 10 is repeatedly transferred to the printing portion 3*a* as many times as the number of copies to be output.

In printer mode, image data that is output from the information processing apparatus 11 or 12 is output from the image forming section 3. That is, the image data from the information processing apparatus 11 or 12 is received by the communication section 5. The device control section 9 sends the input image data to the local memory 10, decompresses the image data on a page basis as outputting image data, and temporarily saves the image data in the hard disk device 4. The image data is sent from the hard disk device 4 to the local memory 10, and transferred to the printing portion 3*a* as in the case of copy mode, and the image is printed.

In scanner mode, image data of a document that is read in the image reading section 1 is communicated to any of the information processing apparatus 11 and 12 over the network. That is, the image data that is output from the CCD 1*a* is made up into an outputting image in the local memory 10 and temporarily saved in the hard disk device 4. The image data is sent from the hard disk device 4 to the local memory 10. The device control section 9 establishes communication with a recipient in the network specified via the operation section 2 and transmits the image data from the communication section 5 to the recipient. The image data may also be transmitted to the external information processing apparatus 12 or the facsimile machine 13 from the communication section 5 over the network and the Internet. By similar operations, in facsimile mode, the device control section 9 transmits image data from the fax modem 7 to the facsimile machine 6 via the telephone line.

Figure 2:
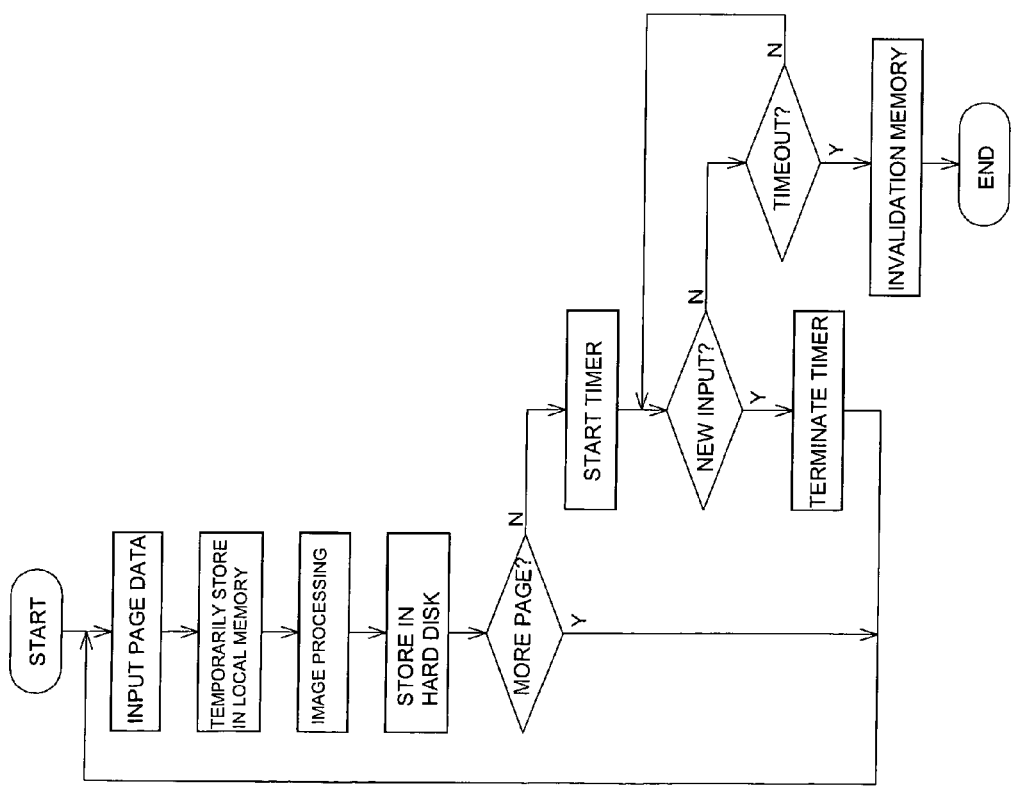
FIG. 2 is a flowchart showing invalidating operation of local memory performed on completion of input of image data.

As shown in FIG. 2, when input image data is processed in the above manner, the image data is stored in the local memory 10 and further saved in the hard disk device 4. Until a certain job is completed, the local memory 10 sequentially overwrites image data to store new image data. The hard disk device 4 saves input image data.

When input of a series of image data is completed in a certain job, the local memory 10 contains the last image data. After all image data that is input from the local memory 10 is saved in the hard disk device 4, the local memory 10 is released.

Then, the device control section 9 checks whether new image data is input. Whether there is an input is checked by measuring the time before a next data input using a timer and by determining whether or not data is input within a certain period. Alternatively, whether there is an input may be checked based on the presence or absence of a document on the document platform or in the document reading section.

If no image data is input, the device control section 9 confirms the completion of input of image data for this job and activates the invalidation means 14. The image data stored in the input data area of the local memory 10 is invalidated. Subsequently, if image data is input for the next job, the device control section 9 inhibits activation of the invalidation means 14. The image data saved in the hard disk device 4 is not invalidated.

Figure 3:
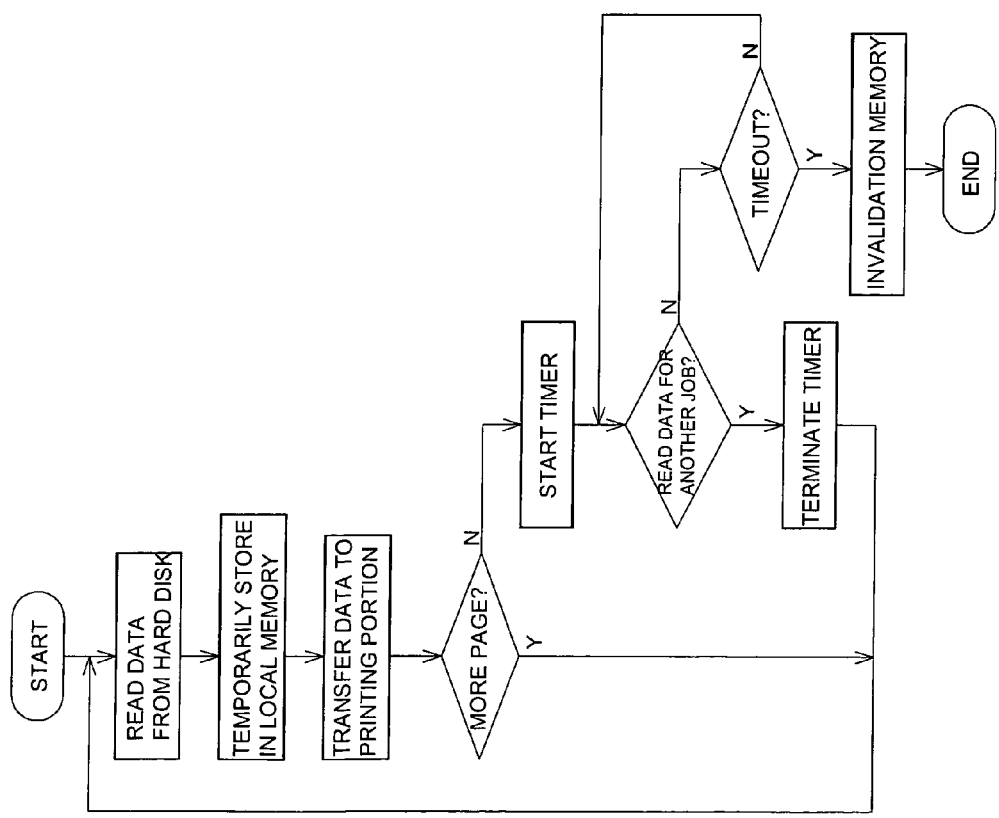
FIG. 3 is a flowchart showing invalidating operation of the local memory performed on completion of processing of image data.

As shown in FIG. 3, image data that is read from the hard disk device 4 for output is stored in the output data area of the local memory 10. After image data is input in a certain job and the image data is output for this job, such as for printing, the device control section 9 checks whether there is another job. This is done by determining whether or not image data for another job is saved in the hard disk device 4. On confirmation that no more jobs exist, the device control section 9 invalidates the image data stored in the output data area of the local memory 10. If there is another job, activation of the invalidation means 14 is inhibited.

Figure 4:
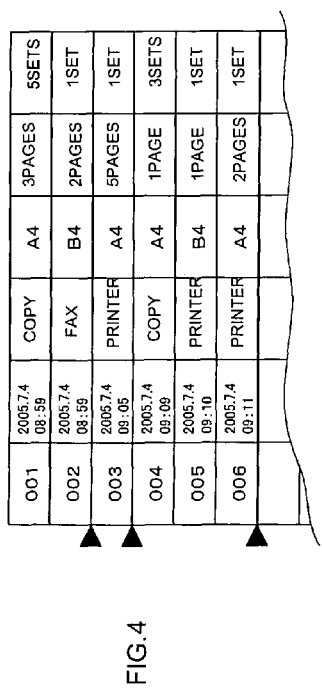
FIG. 4 is a diagram showing a list of jobs.
Figure 5:
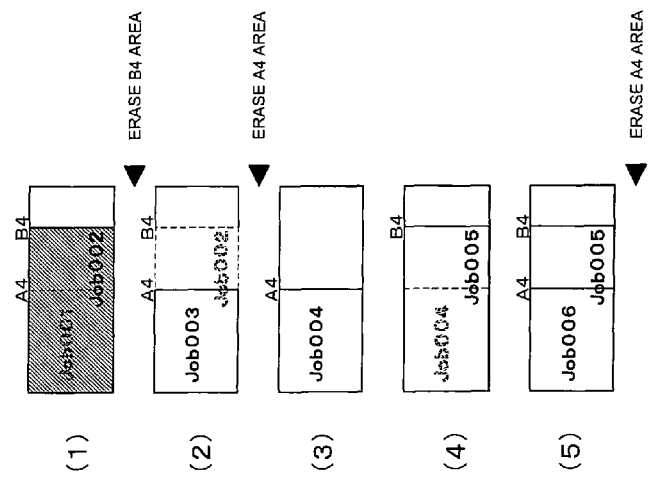
FIG. 5 is a diagram showing the state of the local memory when image data is invalidated.

Referring to FIGS. 4 and 5, the status of the local memory 10 invalidated according to the presence or absence of a job will be described. FIG. 4 shows a list of jobs executed in the data processing apparatus. In a job 001, for example, the performed processing is copying, in which five sets of three A4-size documents are copied. When this job is completed, the local memory 10 contains image data for the job 001 in an A4 area thereof. Subsequently a job 002 is executed, and on completion, image data is stored in a B4 area as shown in FIG. 5(1). The image data for the job 001 is erased because it is overwritten with the new image data. In FIG. 5, image data indicated with dashed lines represents the invalidated state.

A job 003 is executed after a certain amount of time. Therefore, when the certain amount of time has passed, the invalidation means is activated to invalidate the image data for the job 002. Subsequently, when the job 003 is completed, the local memory 10 stores image data for the job 003 as shown in (2). Here, the image data is stored in the A4 area, and part of the B4 area is not overwritten. However, since the B4 area has been invalidated, the image data for the job 002 is unreadable.

A job 004 is executed a certain amount of time after the completion of the job 003, so that the image data for the job 003 is invalidated. When the job 004 is completed, the local memory 10 stores image data for the job 004 as shown in (3).

Subsequently, a job 005 is executed. As shown in (4), the image data for the job 004 is overwritten with image data for the job 005. Subsequently, a job 006 is further executed. While A4-size image data for the job 006 is written, part of the image data for the job 005 stored in the B4 area is left intact as shown in (5).

When the job 006 is completed and no more jobs are left, the image data in the local memory 10 is invalidated. Since the image data in all areas is invalidated at this point, the remaining image data for the job 005 that were not overwritten is also invalidated.

A job may be interrupted before completion. For example, if a stop key is pressed during reading of a document, input of new image data may be canceled, or transmission of image data from the information processing apparatus 11 or 12 may be canceled. In such cases, the device control section 9 activates the invalidation means 14 to invalidate image data in the local memory 10 and the hard disk device 4.

When input of image data is interrupted, the local memory 10 stores image data just before the interruption, and the hard disk device 4 stores all input image data. After input of new image data is stopped and the local memory 10 is released, the invalidation means 14 is activated. The image data in the local memory 10 is invalidated, and the image data in the hard disk device 4 is also erased.

A job is also interrupted when a fault occurs in the data processing apparatus. In this case, the device control section 9 activates the invalidation means 14 as in the above case to invalidate image data in the local memory 10 and the hard disk device 4.

That is, the device control section 9 includes a fault detection means for detecting a fault in the apparatus. The fault detection means detects that the operation of the apparatus is stopped due to some fault such as a document jam, a sheet jam, out of sheets, out of toner, or low toner density. On detection of the stop of the operation, the device control section 9 finds out the cause of the fault and activates the invalidation means 14.

For minor faults that can be readily recovered, such as a document jam, a sheet jam, and out of sheets, the device control section 9 inhibits activation of the invalidation means 14. For faults other than these minor faults, the device control section 9 activates the invalidation means 14. These minor faults are readily solved and the operation of the apparatus is resumed. Since the image data that has been input so far remains, processing of the image data is continued.

Figure 6:
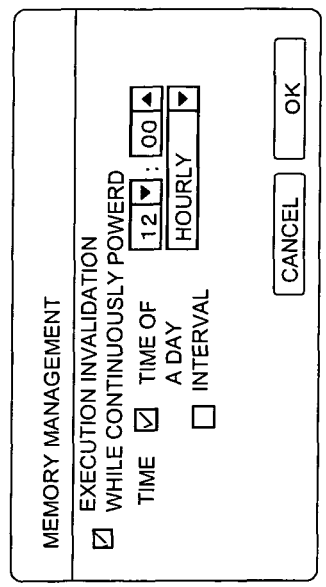
FIG. 6 is a diagram showing a setting screen for setting the time for invalidation.

In another embodiment, the invalidation means 14 is periodically activated while the power is on. That is, when the data processing apparatus is operating round-the-clock, the device control section 9 periodically activates the invalidation means 14. The activation is performed at a preset time. As shown in FIG. 6, a memory management screen is displayed on the display portion 2b, in which execution of periodical invalidation is first selected. After selection of this execution, the time for execution is set. Thus, image data in the local memory 10 is automatically invalidated at the certain preset time of a day.

While the above case involves performing the invalidation once a day, the invalidation may also be repeated at preset time intervals. Execution of periodical invalidation is selected, and a certain time interval is set. Then, the device control section 9 measures the elapsed time since the power-up and activates the invalidation means 14 at the certain time intervals, for example hourly.

While the invalidation is performed at preset times in this manner, the invalidation may overlap with image data processing. Therefore, before activating the invalidation means 14, the device control section 9 checks the processing operation of the apparatus to determine whether to allow or inhibit activation of the invalidation means 14. If the apparatus is in the middle of the processing operation, activation of the invalidation means 14 is inhibited. If the apparatus is not in the middle of the processing operation, activation of the invalidation means 14 is allowed. In the case where the invalidation is inhibited, the processing operation is monitored so that the invalidation may be allowed after the processing operation is completed.

Figure 7:
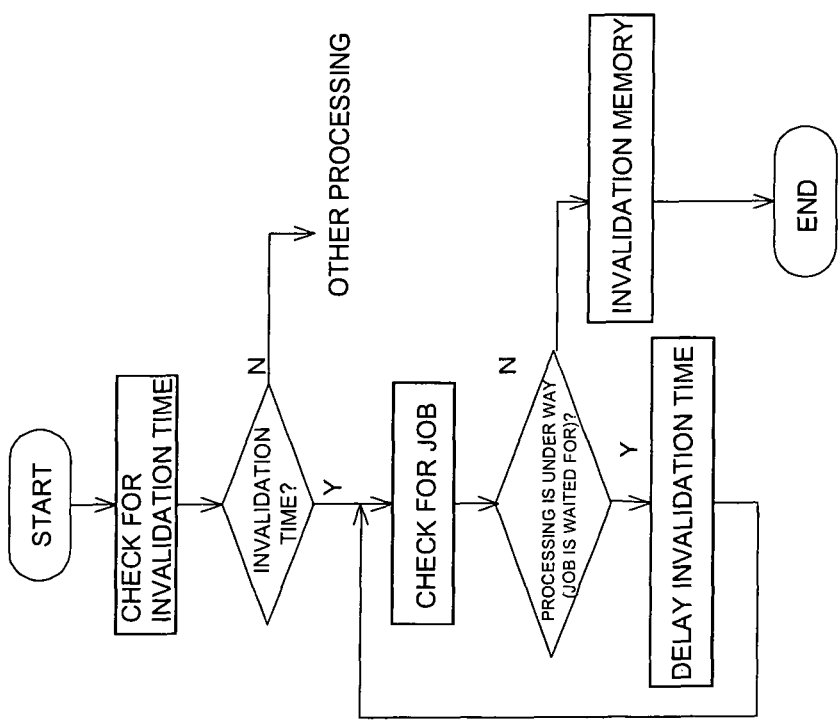
FIG. 7 is a flowchart for periodically performing invalidating operation.

As shown in FIG. 7, the device control section 9 measures the elapsed time with a timer to check whether the preset time has arrived. When the time has arrived, it checks whether a job is being executed. If the processing operation for a job is under way, the device control section 9 does not perform the invalidation and delays the invalidation to wait until completion of the processing operation. On confirmation that the processing operation for the job is completed, the invalidation means 14 is activated to invalidate the image data.

In this manner, the time of performing the invalidation can be arbitrarily set. Therefore, performing the invalidation at night or during the lunch break may allow the invalidation during the absence of jobs, thereby allowing efficient operation of the data processing apparatus.

The data processing apparatus enters power-saving mode when there are no jobs for more than a certain period. Therefore, the activation of the invalidation means 14 may be timed to power-saving mode. In this case, the invalidation is performed with no delay because no processing operation for a job is under way.

The data processing apparatus may not necessarily be used round-the-clock but may be turned off at night. In this case, turning the power off causes image data in the local memory 10 to be erased. Therefore, the device control section 9 selectively performs at least one of a first invalidation processing for invalidating image data in the local memory 10 and a second invalidation processing for invalidating image data in the hard disk device.

That is, if the data processing apparatus is used round-the-clock, at least the first invalidation processing is performed. If the data processing apparatus is not used round-the-clock, at least the second invalidation processing is performed. It is also possible to perform both the first and second invalidation processing regardless of the usage. This selection may be automatically made by the device control section based on the usage determined from the operational state of the apparatus, or may be made according to an input from the operating section 2.

It is to be understood that the present invention is not limited to the above-described embodiments, but many modifications and alterations may be made to the embodiments within the scope of the present invention. Besides the hard disk device, the saving means for temporarily saving image data may be implemented using a recording medium removable from the apparatus, such as nonvolatile memory, an optical disk, a magnetic disk, or a magneto-optical disk.

The data processing apparatus may be a multifunctional machine with copy mode and facsimile mode, as well as a dedicated machine with single mode, such as a copier, a printer, or a facsimile machine. The operational status of the apparatus may be detected by providing a human body sensor for sensing the presence of a person and by detecting whether or not anyone is near the apparatus. If there is someone near the apparatus, the device control section inhibits activation of the invalidation means because the person may perform an input operation. If there is no one near the apparatus, the device control section activates the invalidation means because there is little likelihood that image data is input.

What is claimed is:

1. A data processing apparatus comprising:
    input means for inputting image data;
    processing means for processing the input image data;
    storage means for storing the input image data;
    saving means for temporarily saving image data transferred from the storage means, and in processing the image data, outputting the saved image data to the storage means;
    invalidation means for invalidating image data stored in the storage means; and
    control means for controlling activation of the invalidation means according to the operational status of the apparatus so as to inhibit activation of the invalidation means when the apparatus continues its operation and activate the invalidation means when the apparatus terminates its operation, wherein the control means determines as an operational status whether image data for a job is input or not, then inhibits activation of the invalidation means by judging that the apparatus continues its operation when image data for said a job has been input and wherein, when input of image data for said a job is completed and output of processed image data associated with said job is completed, the control means activates the invalidation means by determining whether image data of a job different from said job is saved in the saving means, when no image data of a job different from said job is input, and inhibiting the invalidation means when image data of a job different from said job has been input wherein the job different from said job has a different time of submission, a different paper size or a different number of copies from said job.

2. The data processing apparatus according to claim 1, wherein, when input of image data is interrupted in the middle of a job, the control means activates the invalidation means to invalidate the image data in the storage means.

3. The data processing apparatus according to claim 1, comprising
    fault detection means for detecting a fault in the apparatus, wherein, when a fault is detected and operation of the apparatus is stopped, the control means causes the invalidation means to invalidate image data in the storage means.

4. The data processing apparatus according to claim 1, wherein the control means periodically activates the invalidation means to invalidate image data in the storage means while the power for the apparatus is on.

5. The data processing apparatus according to claim 4, wherein the control means checks processing operation of the apparatus before activating the invalidation means, and if the apparatus is in the middle of the processing operation, inhibits activation of the invalidation means.

6. The data processing apparatus according to claim 5, wherein the control means activates the invalidation means at a preset time.

7. The data processing apparatus according to claim 5, wherein the control means activates the invalidation means at preset time intervals.

8. The data processing apparatus according to claim 1, wherein the control means invalidates image data in the saving means when processing on the image data is completed.

9. The data processing apparatus according to claim 1,
    wherein the invalidation means comprises a first invalidation processing means for invalidating image data in the storage means and a second invalidation processing means for invalidating image data in the saving means, and
    wherein the control means selectively performs at least one of the first and second invalidation processing.

* * * * *